US010854198B2

(12) United States Patent
Bhaya et al.

(10) Patent No.: US 10,854,198 B2
(45) Date of Patent: Dec. 1, 2020

(54) SEQUENCE DEPENDENT OPERATION PROCESSING OF PACKET BASED DATA MESSAGE TRANSMISSIONS

(71) Applicant: Google LLC, Mountain View, CA (US)

(72) Inventors: Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 16/018,854

(22) Filed: Jun. 26, 2018

(65) Prior Publication Data

US 2018/0308484 A1 Oct. 25, 2018

Related U.S. Application Data

(63) Continuation of application No. 15/395,682, filed on Dec. 30, 2016, now Pat. No. 10,013,978.

(51) Int. Cl.
| | |
|---|---|
| *G10L 15/22* | (2006.01) |
| *G10L 15/26* | (2006.01) |
| *G06F 3/16* | (2006.01) |
| *G06F 16/332* | (2019.01) |
| *G06F 16/33* | (2019.01) |
| *G06F 40/40* | (2020.01) |
| *G06F 40/284* | (2020.01) |
| *G10L 15/00* | (2013.01) |
| *G10L 15/14* | (2006.01) |
| *G10L 15/18* | (2013.01) |
| *G10L 15/08* | (2006.01) |

(52) U.S. Cl.
CPC ............. *G10L 15/22* (2013.01); *G06F 3/16* (2013.01); *G06F 3/167* (2013.01); *G06F 16/3329* (2019.01); *G06F 16/3344* (2019.01); *G06F 40/284* (2020.01); *G06F 40/40* (2020.01); *G10L 15/00* (2013.01); *G10L 15/14* (2013.01); *G10L 15/1822* (2013.01); *G10L 15/26* (2013.01); *G10L 2015/088* (2013.01); *G10L 2015/223* (2013.01)

(58) Field of Classification Search
CPC ... G10L 15/22; G10L 15/26; G10L 2015/223; G06F 3/167
See application file for complete search history.

(56) References Cited

U.S. PATENT DOCUMENTS

| | | | | |
|---|---|---|---|---|
| 6,044,347 | A * | 3/2000 | Abella | G10L 15/18 704/272 |
| 6,275,806 | B1 | 8/2001 | Pertrushin | |
| 6,684,249 | B1 | 1/2004 | Frerichs et al. | |
| 6,732,080 | B1 * | 5/2004 | Blants | G06Q 10/109 705/7.18 |
| 6,857,007 | B1 | 2/2005 | Bloomfield | |
| 6,907,566 | B1 | 6/2005 | McElfresh et al. | |
| 7,668,754 | B1 | 2/2010 | Bridgelall | |
| 7,853,255 | B2 | 12/2010 | Karaoguz et al. | |
| 7,979,877 | B2 | 7/2011 | Huber et al. | |
| 8,165,886 | B1 * | 4/2012 | Gagnon | G10L 15/19 704/275 |
| 8,195,133 | B2 | 6/2012 | Ramer et al. | |
| 8,249,925 | B2 | 8/2012 | Broms et al. | |
| 8,370,197 | B2 | 2/2013 | Axe et al. | |
| 8,386,386 | B1 | 2/2013 | Zhu | |
| 8,666,807 | B1 | 3/2014 | Murray et al. | |
| 8,849,694 | B1 | 9/2014 | Chatterjee et al. | |
| 8,903,716 | B2 | 12/2014 | Chen et al. | |
| 9,424,840 | B1 * | 8/2016 | Hart | G10L 15/22 |
| 9,767,479 | B2 | 9/2017 | Filev et al. | |
| 10,013,978 | B1 * | 7/2018 | Bhaya | G06F 17/277 |
| 10,089,647 | B2 | 10/2018 | Juhasz | |
| 2002/0102988 | A1 | 8/2002 | Myllymaki | |
| 2002/0116287 | A1 | 8/2002 | Schubert et al. | |
| 2002/0116313 | A1 | 8/2002 | Detering | |
| 2004/0044516 | A1 | 3/2004 | Kennewick et al. | |

(Continued)

FOREIGN PATENT DOCUMENTS

| | | |
|---|---|---|
| JP | 2011-210238 | 10/2011 |
| KR | 10-0481141 B1 | 3/2005 |

(Continued)

OTHER PUBLICATIONS

Foreign Action other than Search Report on KR 10-2017-7031607, dated Jul. 26, 2019, 7 pages.
Notice of Allowance on U.S. Appl. No. 15/498,237, dated Aug. 12, 2019, 8 pages.
U.S. Appl. No. 13/532,209, filed Jun. 25, 2012, Filev et. al.
"Going with CPT (cost per time) over CPM for Ads", Startup Nation Business Forum, http://www.startupnation.com/Going-with-CPT-cost-per-time-over-CPM-for-ads/topic/S, Dec. 4, 2010, 3 pgs. [Retrieved from website Jun. 11, 2013].

(Continued)

*Primary Examiner* — Samuel G Neway
(74) *Attorney, Agent, or Firm* — Foley & Lardner LLP; James De Vellis

(57) ABSTRACT

Optimization of sequence dependent operations in a voice activated data packet based computer network environment is provided. A natural language processor component can parse an input audio signal to identify a request and a trigger keyword. A prediction component can determine a thread based on the trigger keyword and the request that includes a first action, a second action subsequent to the first action, and a third action subsequent to the second action. A content selector component can select, based on the third action and the trigger keyword, a content item. An audio signal generator component can generate an output signal comprising the content item. An interface can transmit the output signal to cause a client computing device to drive a speaker to generate an acoustic wave corresponding to the output signal prior to occurrence of at least one of the first action and the second action.

16 Claims, 4 Drawing Sheets

(56) References Cited

U.S. PATENT DOCUMENTS

| | | |
|---|---|---|
| 2004/0193488 A1 | 9/2004 | Khoo et al. |
| 2004/0203860 A1 | 10/2004 | Fellenstein et al. |
| 2005/0267798 A1 | 12/2005 | Panara |
| 2006/0224445 A1 | 10/2006 | Axe et al. |
| 2007/0073723 A1 | 3/2007 | Ramer et al. |
| 2007/0097975 A1 | 5/2007 | Rakers et al. |
| 2007/0127688 A1 | 6/2007 | Doulton |
| 2007/0197239 A1* | 8/2007 | Sane ............... H04W 4/12 455/466 |
| 2007/0281716 A1 | 12/2007 | Altman et al. |
| 2008/0015863 A1* | 1/2008 | Agapi ............... G10L 15/22 704/275 |
| 2008/0248815 A1 | 10/2008 | Busch |
| 2008/0250453 A1 | 10/2008 | Smith et al. |
| 2009/0030800 A1 | 1/2009 | Grois |
| 2009/0070211 A1 | 3/2009 | Gonen |
| 2009/0192929 A1 | 7/2009 | Hoeflinger et al. |
| 2009/0204410 A1 | 8/2009 | Mozer et al. |
| 2009/0228270 A1* | 9/2009 | Odell ............... G10L 15/1815 704/231 |
| 2009/0292587 A1 | 11/2009 | Fitzgerald |
| 2009/0326966 A1 | 12/2009 | Callaghan et al. |
| 2010/0010890 A1 | 1/2010 | Ditkovski et al. |
| 2010/0023396 A1 | 1/2010 | Subramanian et al. |
| 2010/0050098 A1 | 2/2010 | Turner |
| 2010/0057639 A1 | 3/2010 | Schwarz et al. |
| 2010/0088719 A1 | 4/2010 | Hawkins et al. |
| 2010/0176985 A1 | 7/2010 | Sharma |
| 2010/0211439 A1 | 8/2010 | Marci et al. |
| 2010/0292991 A1* | 11/2010 | Lv ............... A63F 13/10 704/275 |
| 2011/0035379 A1 | 2/2011 | Chen et al. |
| 2011/0067099 A1* | 3/2011 | Barton ............... G06Q 30/0244 726/21 |
| 2011/0078014 A1 | 3/2011 | Feldman et al. |
| 2011/0208596 A1 | 8/2011 | Kwon et al. |
| 2011/0246286 A1 | 10/2011 | Cetin et al. |
| 2012/0030034 A1 | 2/2012 | Knapp et al. |
| 2012/0041766 A1* | 2/2012 | Gong ............... G01C 21/3608 704/275 |
| 2012/0123856 A1 | 5/2012 | Paunikar et al. |
| 2012/0130798 A1 | 5/2012 | Cooley et al. |
| 2012/0180083 A1 | 7/2012 | Marcus |
| 2012/0203627 A1 | 8/2012 | Balseiro et al. |
| 2012/0265528 A1 | 10/2012 | Gruber et al. |
| 2013/0036202 A1 | 2/2013 | Lahav |
| 2013/0063550 A1 | 3/2013 | Ritchey et al. |
| 2013/0066725 A1 | 3/2013 | Umeda |
| 2013/0111487 A1 | 5/2013 | Cheyer et al. |
| 2013/0117022 A1 | 5/2013 | Chen et al. |
| 2013/0151332 A1 | 6/2013 | Yan et al. |
| 2013/0275164 A1 | 10/2013 | Gruber et al. |
| 2013/0304758 A1 | 11/2013 | Gruber et al. |
| 2013/0317823 A1* | 11/2013 | Mengibar ............ G06Q 30/0277 704/251 |
| 2014/0067455 A1 | 3/2014 | Zhang et al. |
| 2014/0222436 A1 | 8/2014 | Binder et al. |
| 2014/0278981 A1 | 9/2014 | Mersov et al. |
| 2015/0194167 A1* | 7/2015 | Jeong ............... G10L 25/48 704/275 |
| 2015/0302458 A1 | 10/2015 | Dides et al. |
| 2015/0363748 A1 | 12/2015 | Beaurepaire et al. |
| 2016/0042736 A1 | 2/2016 | Lee et al. |
| 2016/0104200 A1 | 4/2016 | Osotio et al. |
| 2016/0357519 A1 | 12/2016 | Vargas |
| 2017/0034592 A1 | 2/2017 | Ray et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0358301 A1 | 12/2017 | Raitio et al. |
| 2018/0052573 A1* | 2/2018 | Comertoglu ......... G06F 3/0484 |
| 2018/0190276 A1* | 7/2018 | Bhaya ............... G06F 17/277 |
| 2018/0308484 A1* | 10/2018 | Bhaya ............... G06F 17/277 |

FOREIGN PATENT DOCUMENTS

| | | |
|---|---|---|
| KR | 10-2008-0072673 | 8/2008 |
| KR | 10-2012-0110751 A | 10/2012 |
| KR | 10-2012-0137425 | 12/2012 |
| WO | WO-2007/064482 A1 | 6/2007 |

OTHER PUBLICATIONS

"Going with CPT (cost per time) over CPM for Ads", Startup Nation Business Forum, 3 pagse.

"Walmart and Google to offer voice-enabled shopping", BBC News, Aug. 23, 2017 (10 pages).

Abrams, Help users find, interact & re-engage with your app on the Google Assistant, Google Developers Blog, Nov. 15, 2017, 16 pages.

Ad Traders, "Attention Economics Pricing in Advertising: Cost Per Second" Ad Exchanger, 5 pages.

Ad Traders, "Attention Economics Pricing in Advertising: Cost Per Second", Ad Exchanger, http://www.adexchanger.com/data-driven-thinking/attention-economics/, Oct. 19, 2010, [Retrieved from website Jun. 22, 2015].

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075 (5 pages).

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition Within Messages", May 11, 2017, 11 pages.

Buckland et al., "Amazon's Alexa Takes Open-Source Route to Beat Google Into Cars", Bloomberg, Feb. 27, 2018, 6 pages.

Chen, Yilun Lulu, "Alibaba Challenges Google, Amazon With New Echo-Like Device", Bloomberg, Jul. 5, 2017, 3 pages.

Close, "Amazon Echo Will Give You These Deals If You Order Through Alexa This Weekend," Web Article, Nov. 18, 2016, Time.com (2 pages).

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Communication pursuant to Article 94(3) EPC for EP Application No. 17772516.5 dated Mar. 27, 2019.

Cook, "A Siri for advertising: These mobile ads talk back to you," Web Article, Apr. 1, 2013, Geekwire.com (7 pages).

Crist, Ry, "Logitech Harmony's Alexa Skill just got a whole lot better", cnet, Jul. 13, 2017 (2 pages).

Donald J. Patterson, Xianghua Ding, Nicholas Noack. 2006. Nomatic: Location by, for, and of crowds. Proceedings of International Workshop on Location- and Context-Awareness LoCA 2006. 186-203. DOI=10.1007/11752967_13 (18 pages).

Estes, "Amazon's Newest Gadget Is a Tablet That's Also an Echo", Gizmodo, Sep. 19, 2017, 3 pages.

Final Office Action on U.S. Appl. No. 15/596,943 dated Apr. 9, 2019.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

(56) References Cited

OTHER PUBLICATIONS

Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI= 10.1007/11551201_13 (19 pages).
Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008 (12 pages).
Golgowski, Nina, "This Burger King Ad Is Trying to Control Your Google Home Device", Huffpost, Apr. 12, 2017 (7 pages).
Google Developers Newsletter "Google Assistant SDK", developers.google.com, retrieved on Jul. 12, 2017, 2 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, PERVASIVE 2005. 134-151. DOI= 10.1007/11428572_9 (18 pages).
Ian Smith. 2005. Social-Mobile Applications. Computer 38, 4 (Apr. 2005), 84-85. DOI=http://dx.doi.org/10.1109/MC.2005.140 (2 pages).
International Preliminary Report on Patentability for PCT/US2013/047593 dated Jan. 8, 2015.
International Preliminary Report on Patentability on PCT/US2014/036341 dated Dec. 15, 2015, 6 pgs.
International Search Report and Written Opinion for PCT Appl. Ser. No. PCT/US2017/049709 dated Dec. 5, 2017, 12 pages.
International Search Report and Written Opinion in PCT Application No. PCT/US2014/036341 dated Sep. 2, 2014.
International Search Report and Written Opinion on PCT/US2013/047593 dated Nov. 4, 2013.
Johnston, "Amazon Whirlwind: New Echo, Plus, Spot, Connect, Fire TV Take the Stage", Twice, Sep. 27, 2017, 4 pages.
Juhong Liu, O. Wolfson and Huabei Yin. 2006. Extracting Semantic Location from Outdoor Positioning Systems. 7th International Conference on Mobile Data Management. doi: 10.1109/MDM.2006.87 (8 pages).
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC, May 18, 2017, 11 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology. (9 pages).
Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338. (5 pages).
Marc Davis, Simon King, Nathan Good, and Risto Sarvas. 2004. From context to content: leveraging context to infer media metadata. In Proceedings of the 12th annual ACM international conference on Multimedia (Multimedia '04). ACM, New York, NY, USA, 188-195. DOI=http://dx.doi.org/10.1145/1027527.1027572 (8 pages).
Nieva, Richard, "Google Home and eBay can tell you how much that's worth", cnet, Mar. 8, 2017 (3 pages).
Non-Final Office Action on U.S. Appl. No. 15/091,323 dated Feb. 25, 2019.
Non-Final Office Action on U.S. Appl. No. 15/498,237 dated Feb. 8, 2019.
Non-Final Office Action on U.S. Appl. No. 15/584,839 dated Feb. 25, 2019.
Non-Final Office Action on U.S. Appl. No. 15/596,943 dated Dec. 19, 2018.
Non-Final Office Action on U.S. Appl. No. 15/632,924 dated May 1, 2019.
Notice of Reasons for Rejection for JP Application No. 2017-556903 dated Feb. 25, 2019.
Novet, et al., "Amazon is getting ready to bring Alexa to work", CNBC, Nov. 29, 2017, 4 pages.
Office Action for Korean Patent Application No. 10-2017-7031607 dated Jan. 24, 2019.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-goog le-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.

(56) References Cited

OTHER PUBLICATIONS

Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI= http://dx.doi.org/10.1145/990064.990072 (13 pages).
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Spalding, Steve, "How to Cost User Engagement", How to Spilt an Atom—Ideas Reborn, 4 pages.
Spalding, Steve, "How to Cost User Engagement", How to Split an Atom—Ideas Reborn, http://howtosplitanatom.com/how-to-read-shorts/how-to-cost-user-engagement/, Sep. 20, 2007, [Retrieved from website Jun. 22, 2015].
Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030 (8 pages).
Unknown Author, "'Dolphin' attacks fool Amazon, Google voice assistants", BBC News, Sep. 7, 2017, 8 pages.
U.S. Notice of Allowance for U.S. Appl. No. 15/395,682 dated Feb. 26, 2018. 9 pages.
U.S. Notice of Allowance for U.S. Appl. No. 15/395,682 dated Feb. 26, 2018.
U.S. Notice of Allowance on U.S. Appl. No. 13/532,209 dated Jul. 10, 2017.
U.S. Notice of Allowance on U.S. Appl. No. 13/532,209 dated Mar. 31, 2017.
U.S. Notice of Allowance on U.S. Appl. No. 13/790,087 dated Jan. 6, 2016.
U.S. Office Action on U.S. Appl. No. 12/851,833 dated Aug. 8, 2012.
U.S. Office Action on U.S. Appl. No. 13/532,209 dated Nov. 4, 2013.
U.S. Office Action on U.S. Appl. No. 13/532,209 dated Jul. 3, 2013.
U.S. Office Action on U.S. Appl. No. 13/532,209 dated Mar. 4, 2014.
U.S. Office Action on U.S. Appl. No. 13/532,209 dated Oct. 28, 2016.
U.S. Office Action on U.S. Appl. No. 13/790,087 dated Jan. 26, 2017.
U.S. Office Action on U.S. Appl. No. 13/790,087 dated Jun. 9, 2016.
U.S. Office Action on U.S. Appl. No. 13/916,407 dated Jun. 19, 2015.
U.S. Office Action on U.S. Appl. No. 13/916,407 dated Nov. 17, 2015.
U.S. Office Action on U.S. Appl. No. 13/972,379 dated Jun. 24, 2015.
Willens, Max, "For publishers, Amazon Alexa holds promise but not much money (yet)", Digiday, Jul. 6, 2017, 5 pages.
Final Office Action on U.S. Appl. No. 13/790,121 dated Dec. 17, 2014 (5 pages).
Non-Final Office Action on U.S. Appl. No. 13/790,121 dated Aug. 13, 2014 (6 pages).
Non-Final Office Action on U.S. Appl. No. 15/584,839 dated Sep. 6, 2019 (17 pages).
Notice of Allowance on U.S. Appl. No. 13/790,121 dated Aug. 27, 2015 (8 pages).
Notice of Allowance on U.S. Appl. No. 13/790,121 dated Jun. 9, 2014 (8 pages).
Non-Final Office Action for U.S. Appl. No. 15/596,943 dated Dec. 10, 2019 (23 pages).
Decision to Grant a Patent for JP 2017-556903 dated Oct. 7, 2019 (5 pages).
Non-Final Office Action for U.S. Appl. No. 15/632,924 dated Oct. 9, 2019 (17 pages).
Reason for Refusal for KR 10-2017-7031607 dated Sep. 16, 2019 (7 pages).
Examination Report for AU 2017386093 dated Nov. 29, 2019 (2 pages).
Notice of Allowance for U.S. Appl. No. 15/498,237 dated Nov. 29, 2019 (6 pages).
Notice of Allowance for U.S. Appl. No. 15/596,943 dated Jun. 5, 2020 (10 pages).
Peterson, et al., "Location-Based Advertising: The Key to Unlocking the Most Value in the Mobile Advertising and Location-Based Services Markets", Peterson Mobility Solutions, Dec. 2009, available at URL: https://www.mmaglobal.com/files/PetersonMobility_20100217144146.pdf, pp. 1-39 (39 pages).
Examination Report for IN Appln. Ser. No. 201747039586 dated Jan. 24, 2020 (6 pages).
Final Office Action for U.S. Appl. No. 15/596,943 dated Mar. 30, 2020 (22 pages).
Finch, Dezon K., "TagLine: Information Extraction for Semi-Structured Text Elements in Medical Progress Notes", Scholar Commons, Graduate Theses and Dissertations, University of South Florida, Jan. 2012, retrieved Mar. 25, 2020 from URL: http://scholarcommons.usf.edu/etd/4321 (251 pages).
Nahm, Un Yong, "Text Mining with Information Extraction", May 30, 2010, retrieved Mar. 25, 2010 from URL: http://neuro.bstu.by/ai/Data-mining/ut-ai-tr04-311.pdf (132 pages).
Non-Final Office Action for U.S. Appl. No. 15/584,839 dated May 1, 2020 (17 pages).
Notice of Allowance for U.S. Appl. No. 15/632,924 dated Mar. 31, 2020 (13 pages).

\* cited by examiner

SEQUENCE DEPENDENT OPERATION PROCESSING OF PACKET BASED DATA MESSAGE TRANSMISSIONS

CROSS-REFERENCES TO RELATED APPLICATIONS

This application claims the benefit of priority under 35 U.S.C. § 120 as a continuation of U.S. patent application Ser. No. 15/395,682, titled SEQUENCE DEPENDENT OPERATION PROCESSING OF PACKET BASED DATA MESSAGE TRANSMISSIONS and filed on Dec. 30, 2016, which is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system to optimize processing of sequence dependent operations in a voice activated data packet based computer network environment. A natural language processor component executed by a data processing system can receive data packets. The data packets can include an input audio signal detected by a sensor of a client computing device. The natural language processor component can parse the input audio signal to identify a request and a trigger keyword corresponding to the request. A prediction component can determine a thread based on the trigger keyword and the request. The thread can include a first action, a second action subsequent to the first action, and a third action subsequent to the second action. The prediction component can provide, to a content selector component of the data processing system, an indication of the third action prior to occurrence of at least one of the first action and the second action. The content selector component can select, based on the third action and the trigger keyword identified by the natural language processor, a content item via a real-time content selection process. An audio signal generator component executed by the data processing system can generate an output signal comprising the content item. An interface of the data processing system can transmit data packets comprising the output signal generated by the audio signal generator component to cause an audio driver component executed by the client computing device to drive a speaker of the client computing device to generate an acoustic wave corresponding to the output signal prior to occurrence of at least one of the first action and the second action.

At least one aspect is directed to a method to invoke actions for sequence dependent operations in a voice activated data packet based computer network environment. The method includes receiving, by a natural language processor component executed by a data processing system, data packets comprising an input audio signal detected by a sensor of a client computing device. The method includes identifying, by the natural language processor component, based on the input audio signal, a request and a trigger keyword corresponding to the request. The method includes determining, by a prediction component, a thread based on the trigger keyword and the request. The thread can include a first action, a second action subsequent to the first action, and a third action subsequent to the second action. The method can include providing, by the prediction component, to a content selector component of the data processing system, an indication of the third action prior to occurrence of at least one of the first action and the second action. The method can include selecting, by the content selector component, based on the third action and the trigger keyword identified by the natural language processor, a content item via a real-time content selection process. The method can include obtaining, by an audio signal generator component executed by the data processing system, an output signal comprising the content item. The method can include transmitting, via an interface of the data processing system, data packets comprising the output signal obtained by the audio signal generator component to cause an audio driver component executed by at least one of the client computing device and a second client computing device to drive a speaker of the client computing device to generate an acoustic wave corresponding to the output signal prior to occurrence of at least one of the first action and the second action.

At least one aspect is directed to a computer readable storage medium storing instructions that when executed by one or more data processors, cause the one or more data processors to perform operations to select sequence dependent operations in a voice activated data packet based computer network environment. The operations can receive, by a natural language processor component executed by a data processing system, data packets comprising an input audio signal detected by a sensor of a client computing device. The operations can identify, by the natural language processor component, based on the input audio signal, a request and a trigger keyword corresponding to the request. The operations can select, by a prediction component, a thread based on the trigger keyword and the request. The thread can include a first action, a second action subsequent to the first action, and a third action subsequent to the second action. The operations can provide, by the prediction component, to a content selector component of the data processing system, an indication of the third action prior to occurrence of at least one of the first action and the second action. The operations can select, by the content selector component, based on the third action and the trigger keyword identified by the natural language processor, a content item via a real-time content selection process. The operations can generate, by an audio signal generator component executed by the data processing system, an output signal comprising the content item. The operations can transmit, via an interface of the data processing system, data packets comprising the output signal generated by the audio signal generator component to cause an audio driver component executed by the client computing device to drive a speaker of the client computing device to generate an acoustic wave corresponding to the output signal prior to occurrence of at least one of the first action and the second action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
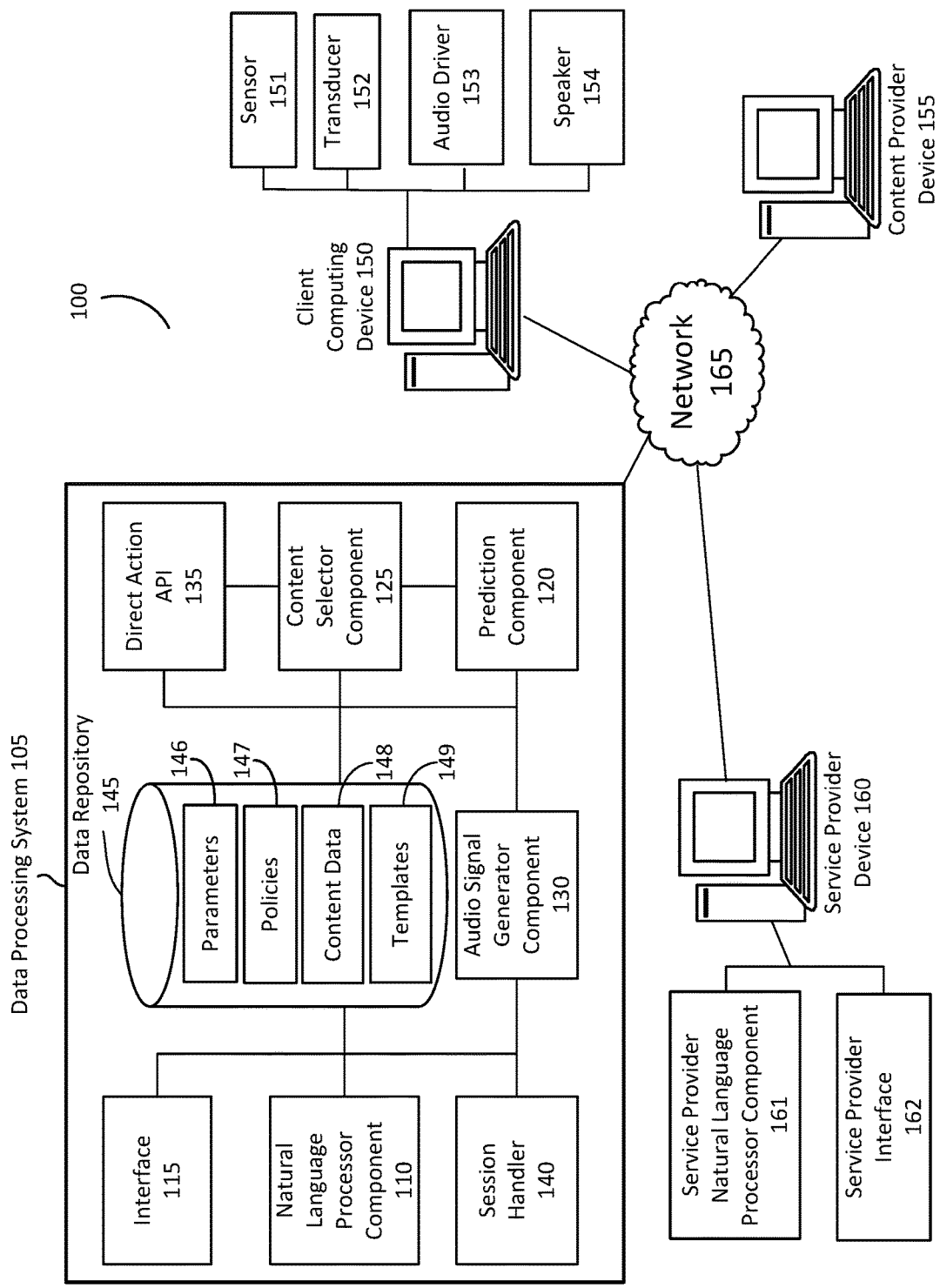
FIG. 1 depicts a system to optimize processing of sequence dependent operations in a voice activated computer network environment.

Following below are more detailed descriptions of various concepts related to, and implementations of, methods, apparatuses, and systems to optimize processing of sequence dependent operations in a voice activated computer network environment. The various concepts introduced above and discussed in greater detail below may be implemented in any of numerous ways.

Systems and methods of the present disclosure relate generally to a data processing system that optimizes or dynamically adjusts an order of processing sequence dependent operations via data packet based transmissions in a voice activated computer network environment. The data processing system can improve the efficiency and effectiveness of data packet transmission over one or more computer networks by, for example, asynchronously, out-of-sequence, or dynamically selecting operations from a plurality of sequence dependent operations. Data packets or other protocol based signals corresponding to the selected operations can be routed through a computer network between multiple computing devices. The data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query. From the input audio query the data processing system can identify a request and a trigger keyword corresponding to the request. Based on the trigger keyword or the request, the data processing system can determine a thread that indicates a plurality of sequence dependent operations. For example, the thread can indicate a first action, a second action that is subsequent to the first action, and a third action that is subsequent to the second action. The third action, which in this example is the last action in a thread of sequence dependent operations, can be used by the data processing system to select a content item prior to occurrence of the first action and prior to occurrence of the second action. This can be done before or without performing at least some of the data processing operations based on the first action or the second action. Bypassing these processing operations causes the content item for the third action to be selected with less data processing and less electrical power usage than would be the case without the bypass.

The content item can include an output signal. The data processing system can provide the content item including the output signal by packet or other protocol based data message transmission via a computer network to a client computing device. The output signal can cause an audio driver component of the client computing device to generate an acoustic wave, e.g., an audio output, which can be output from the client computing device. The audio output corresponds to the third (e.g., last or latest in time) action and can by output from the client computing device prior to occurrence of the first action or prior to occurrence of the second action. The bypassing of the first and second actions (or the bypassing of selecting and providing content items corresponding to these actions) to first select and send the content item corresponding to the third action prior to occurrence of the first and second sequence dependent actions results in fewer data processing operations, less memory usage, and less network bandwidth utilization than would be the case without the bypass.

FIG. 1 depicts an example system 100 to optimize processing of sequence dependent operations in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from an audio input signal a request and a trigger keyword associated with the request. Based on the request and trigger keyword the data processing system 105 can determine or select a thread than includes a plurality of sequence dependent operations, and can select content items (and initiate other actions as described herein) in an order that does not match the sequence of dependent operations, for example as part of a voice activated communication or planning system. The content items can include one or more audio files that when rendered provide an audio output or acoustic wave. The content items can include other content (e.g., text, video, or image content) in addition to or instead of audio content. For example the content items can include text or image files, or combinations thereof, that do not include audio files and that do not render audio output.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one prediction component 120, at least one content selector component 125, at least one audio signal generator component 130, at least one direct action application programming interface (API) 135, at least one session handler component 140, and at least one data repository 145. The NLP component 110, interface 115, prediction component 120, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 150, the content provider computing device 155, or the service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The computer generated voice can include recordings from a real person or computer generated language.

The content provider computing device 155 can provide audio based content items for display by the client computing device 150 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 105 where they can be stored in the data repository 145. The data processing system 105 can select the audio content items and provide (or instruct the content provider computing device 155 to provide) the audio content items to the client computing device 150. The audio based content items can be exclusively audio or can be combined with text, image, or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages to the direct action API 135 of the data processing system 105. The service provider computing device 160 and the content provider computing device 155 can be associated with the same entity. For example, the content provider computing device 155 can create, store, or make available content items for a car sharing service, and the service provider computing device 160 can establish a session with the client computing device 150 to arrange for a delivery of a taxi or car of the car share service to pick up the end user of the client computing device 150. The data processing system 105, via the direct action API 135, the NLP component 110 or other components can also establish the session with the client computing device, including or bypassing the service provider computing device 160, to arrange for example for a delivery of a taxi or car of the car share service.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include content items for audio output or associated metadata, as well as input audio messages that can be part of one or more communication sessions with the client computing device 150.

The system 100 can optimize processing of sequence dependent operations in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of audio output for display from the client computing device 150 to accomplish tasks related to this input audio signal. The tasks can include, for example, communicating with the service provider computing device 160 or other third party computing devices to make dinner reservations or purchase movie tickets. For example, an end user can enter an input audio signal into the client computing device 150 of: "OK, I would like to go to go dinner and then a movie tonight."

The sequence dependent operations can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater. In this example, the second action in the sequence (watching the movie) is subsequent to and dependent on the first action (going out to dinner), and the third action (returning home) is subsequent to and dependent on the first action and the second action. The third action can be considered subsequent to and dependent on the second action, as having expressed an intent to do so, the data processing system 105 predicts that the end user would watch the movie in the theater before returning home as well.

The data processing system 105 can include an application, script or program installed at the client computing device 150, such as an app to communicate input audio signals to the interface 115 of the data processing system 105 and to drive components of the client computing device to render output audio signals. The data processing system 105 can receive data packets or other signal that includes or identifies an audio input signal. For example, the data processing system 105 can execute or run the NLP component 110 to receive the audio input signal.

The NLP component 110 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The audio input signal can be detected by the sensor 151 (e.g., a microphone) of the client computing device. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The prediction component 120 (or other mechanism of the data processing system 105) can determine, based on the request or the trigger keyword, at least one thread associated with the input audio signal. The thread can indicate a set of sequence dependent operations, such as a series of actions. The thread can include any two or more actions, such as a first action, a second action, and a third action. For example, the input audio signal "OK, I would like to go to go dinner and then a movie tonight" can include at least one request indicating an interest to attend dinner and a movie, and at least one trigger keyword, e.g., "go" indicating a need for transportation. The prediction component 120 can identify a thread with at least three actions, such as a dinner action (first action), a movie action (second action), and a transportation home action (third action). In this example, from the request or the trigger keyword the prediction component 120 predicts, estimates, or otherwise determine the three actions. The thread can include other actions, such as an initial transport to dinner action.

The data processing system 105 or component thereof such as the prediction component 120 can determine that the actions of the thread are sequence dependent operations. For example, the prediction component can determine that the second action of watching the movie is subsequent to the first action of eating dinner, and that the third action of travelling home from the movie theater is after the second action of watching the movie. The prediction component 120 can access the parameters 146 or policies 147 in the data repository 145 to determine or otherwise estimate the order of the sequence dependent actions. For example, the parameters 146 or policies 147 could indicate that a transport action (e.g., a taxi home) can occur after an event action (e.g., watching a movie).

The content selector component 125 can obtain indications of any of the actions of the thread. For example, the prediction component 120 can directly or indirectly (e.g., via the data repository 145) provide an indication of the third (or any other) action to the content selector component 125. The content selector component 125 can obtain this information from the data repository 145, where it can be stored as part of the content data 148. The indication of the third action can inform the content selector component 125 of a need for transportation from the location of the movie theater to a location as determined or indicated by the client computing device 150, such as a ride to an end destination.

The content selector component 125 can obtain indications of a later action in the thread prior to the occurrence of at least one earlier action. For example, the content selector component 125 can receive an indication of the third action (e.g., a need for a ride from the movie theater) before the movie plays in the theater (second action), or before the person who input the input audio signal into the client computing device 150 eats dinner at the restaurant (first action). The content selector component 125 can obtain indications of at least one action of the thread before completion of at least one action of the thread.

From the information received by the content selector component 125, e.g., an indication of the third action before occurrence of at least one prior action in the sequence dependent thread, the content selector component 125 can identify at least one content item. The content item can be responsive or related to the third action. For example, the content item can include an audio message offering services of a car share company, responsive to the third action that indicates a transportation need. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150.

The audio signal generator component 130 can generate or otherwise obtain an output signal that includes the content item responsive to the third action. For example, the data processing system 105 can execute the audio signal generator component to generate or create an output signal corresponding to the content item. The interface 115 of the data processing system 105 can provide transmit one or more data packets that include the output signal via the computer network 165 to the client computing device 150. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

For example the data processing system 105 can provide the output signal from the data repository 145 or from the audio signal generator component 130 to the client computing device 150. The data processing system 105 can also instruct, via data packet transmissions, the content provider computing device 155 or the service provider computing device 160 to provide the output signal to the client computing device 150. The output signal can be obtained, generated, transformed to or transmitted as one or more data packets (or other communications protocol) from the data processing system 105 (or other computing device) to the client computing device 150.

In this example the content selector component 125 skips to a later (e.g., third) action in a set of sequence dependent operations to select a content item for the third action prior to occurrence (and prior to an immediate need) for activity corresponding to the third action. By skipping to a later sequenced action, the data processing system 105 is not required to process information related to the first action or the second action to select content items for those actions. This reduces processor utilization, power consumption and bandwidth from data transmissions that would otherwise be associated with selecting a content item (for the first action) or a content item (for the second action) prior to selecting the content item for the third action.

The content selector component 125 can select the content item for the (subsequent or later) third action as part of a real-time content selection process. For example, the content item can be provided to the client computing device for transmission as audio output in a conversational manner in direct response to the input audio signal. The real-time content selection process to identify the content item and provide the content item to the client computing device 150 can occur within one minute or less from the time of the input audio signal and be considered real-time.

The output signal that corresponds to the content item, for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the output signal. The acoustic wave can include words of or corresponding to the content item for the third action. The output signal that corresponds to the content item can also include non-audio content items that render on the client computing device 150 that is the source of the input audio signal or on a different client computing device 150 (e.g., a wearable device computing device) as text or image messages that can render without audio elements.

The acoustic wave can be output from the client computing device 150 before the occurrence of the first action or the second action. For example, the acoustic wave can include the audio output of "Would you like a taxi waiting for you after the movie?" In this example, the data processing system 105 obtains the input audio signal of, for example, "OK, I would like to go to go dinner and then a movie tonight." From this information the NLP component 110 identifies at least one request or at least one trigger keyword, and the prediction component 120 uses the request(s) or trigger keyword(s) to identify at least one thread. The thread includes a series of sequence dependent actions, e.g., a first dinner action, a second movie action, and a third transport home action. The prediction component 120 can determine (e.g., with at least a threshold level of confidence such as 75% confident) that these actions will occur in sequential order, where the end user of the client computing device 150 will first eat dinner, then after dinner go to a movie, then after dinner take transportation home or away from the movie theater. The content selector component 125 can, for example, bypass processing associated with content item selection for the first action and the second action and instead first select a content item for the third action, e.g., a content item for a car share service to arrange for transport with a pick-up location of the movie theater. The data processing system 105 or component thereof such as the audio signal generator component 130 can provide the content item for the third action to the client computing device 150. The acoustic wave can be output from the client computing device 150 subsequent to the occurrence of the first action and before the occurrence of the second action, e.g., between prior actions in the thread.

The content item for the third item can render at least in part as an audio output from the client computing device 150 before the first action or the second action has occurred. For example, the output signal that includes the content item for the third action can render as a human or automated voice that states "Would you like a ride home from the movie theater?" The data processing system 105 can receive a response to the content item for the third action prior to occurrence of one, more than one, or all of the prior actions in the ordered sequence of actions. For example, the data processing system 105 can provide the content item for rendering and receive a response, e.g., via the interface 115, before the end user has gone to dinner or before the end user has watched the movie. The data processing system 105 can provide the output signal that includes the content item in direct or real-time response to the input audio signal of "OK, I would like to go to go dinner and then a movie tonight" so that the packet based data transmissions via the computer network 165 that are part of a communication session between the data processing system 105 and the client computing device 150 has the flow and feel of a real-time person to person conversation. This packet based data transmission communication session can also include the content provider computing device 155 or the service provider computing device 160.

The content selector component 125 can select content items provided in response to the third (or any non-first) action in the sequence dependent set of actions before selecting any content item for any prior action in the sequence. This avoids the need to process at least some of the data corresponding to the prior actions, which causes the third content item to be selected with a reduced number of processing operations than would occur if the content items were selected in an order that matches the order of the sequence of actions. Content items for the prior (e.g., first and second) actions may or may not be selected, for example after selection of the content item for the third action.

The content selector component 125 can select the content item (e.g., for the third action) based on at least one trigger keyword of the thread that indicates subject matter different than subject matter of the one or more requests of the same thread. For example, the requests of the thread responsive to "OK, I would like to go to go dinner and then a movie tonight" can indicate subject matter of a dinner request (first action), and subject matter of a movie request (second action). This subject matter does not indicate any transportation request. However, the NLP component 110 or the prediction component 120 (or other data processing system 105 components executing as part of the direct action API 135) can identify the trigger keyword "go" "go to" or "to go to" and can determine a transportation request (third action) based at least in part on the trigger keyword. Thus, the data processing system 105 can infer actions from the input audio signal that are secondary requests that are not the primary request or subject of the input audio signal.

The data processing system 105 can prevent or delay transmission of the output signal that includes the content item. For example, the interface 115 or a script executing via the direct action API 135 can prevent transmission of data packets that include the output signal corresponding to the content item until a triggering event. The triggering event can include expiration of a pre-determined time period, such as two hours or a time coinciding with occurrence of an earlier action in the thread, such as a scheduled end time of a movie. The triggering event can also include an authorization indication received by the data processing system 105 from the client computing device 150. The authorization indication can originate as a subsequent audio input associated with the thread but received by the data processing system subsequent to the input audio signal, a text-based or other non-audible signal, or can include an indication of a setting of the client computing device 150 that authorizes receipt by the client computing device 150 of content items.

The data processing system 105 can also delay transmission of the content item associated with a second or subsequent to second action of the thread to optimize processing utilization. For example, the data processing system 105 can delay content item transmission until an off-peak or non-peak period of data center usage, which results in more efficient utilization of the data center by reducing peak bandwidth usage, heat output or cooling requirements. The data processing system 105 can also initiate a conversion or other activity associated with the content item, such as ordering a car service, based on data center utilization rates or bandwidth metrics or requirements of the network 165 or of a data center that includes the data processing system 105.

The content items can correspond to the actions of the thread, and the content selector component 125 can select a content item for one, more than one, or all actions of the thread. The prediction component 120 can identify the sequence dependent thread of actions of, for example, "dinner" (first action) "movie" (second action) and "transport from movie location" (third action). The direct action API 135 can execute programs or scripts, for example from the NLP component 110, the prediction component 120, or the content selector component 125 to identify content items for one or more of these actions. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The direct action API 135 of the data processing system 105 can generate, based on the request or the trigger keyword, data structures for the actions of the thread. The action data structures can be generated responsive to the request. The action data structure can be included in the messages that are transmitted to or received by the service provider computing device 160. Based on the request parsed by the NLP component 110, the direct action API 135 can determine to which of a plurality of service provider computing devices 160 the message should be sent. For example, if an input audio signal includes "order a taxi," the NLP component 110 can identify the trigger word "order" and the request for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location and a destination location. The direct action API 135 can retrieve a template 149 from the repository 145 to determine which fields to include in the action data structure. The direct action API 135 can retrieve content from the repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

For example the content item for the third action can be provided for rendering at the client computing device 150 as an audio response that states "Would you like a ride home from the movie theater?" in response to the audio input signal. Subsequent or prior to this rendering, the data processing system 105 can select or provide a content item, e.g., "the Italian restaurant downtown has an opening for 7 pm tonight?" for the first action (dinner), and can select or provide another content item, e.g., "would you like tickets to the 9 pm movie at the downtown theater?" for the second action (movie). The data processing system 105 can provide (which includes instructing the content provider computing device 155 to provide) these content items responsive to the input audio signal for rendering by the client computing device 150 as audio output content items. The data processing system 105, via the interface 115, can select or provide these content items in any order to the client computing device 150. For example, the content item for the third (e.g., last) action can be selected or provided first, before content items corresponding to other, earlier actions of the thread.

The data processing system 105 can receive a response to the content item "would you like a ride home from the movie theater?" The response can include an input audio signal, e.g., "yes please" that was entered into the client computing device 150 by the end user and received by the data processing system 105. Based on this response, the direct action API 135 can communicate with the service provider computing device 160 (that can be associated with the content item, such as a car share company) to order a taxi or ride share vehicle for the location of the movie theater at the time the movie ends. The data processing system 105 can obtain this location or time information as part of the data packet (or other protocol) based data message communication with the client computing device 150, from the data repository 145, or from other sources such as the service provider computing device 160 or the content provider computing device 155. Confirmation of this order (or other conversion) can be provided as an audio communication from the data processing system 105 to the client computing device 150 in the form of an output signal from the data processing system 105 that drives the client computing device 150 to render audio output such as, "great, you will have a car waiting for you at 11 pm outside the theater." The data processing system 105, via the direct action API 135, can communicate with the service provider computing device 160 to confirm the order for the car.

The data processing system 105 can obtain the response (e.g., "yes please") to the content item ("would you like a ride home from the movie theater?") and can route a packet based data message to the service provider NPL component 161 (or other component of the service provider computing device). This packet based data message can cause the service provider computing device 160 to effect a conversion, e.g., to make a car pick up reservation outside the movie theater. This conversion—or confirmed order— (or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the data processing system 105 can initiate a conversion or action. This can occur before the end user has begun any activities associated with the thread, e.g., before dinner or before the movie is over. Processors of the data processing system 105 can invoke the direct action API 135 to execute scripts that order a car from a car share service. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation.

The direct action API 135 can initiate the conversion or activity to accomplish an action of the thread at any time during a time period from receipt by the data processing system 105 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The data processing system 110 can also determine the end of this time period based on other factors, such as an indication that the end user has completed the actions of the thread, e.g., has returned home or is no longer located at the movie theater. The data processing system 105 can also obtain an indication from the client computing device 150 (a data message transmitted via the network 165) that the thread is cancelled or dormant or that the end user has cancelled or completed actions of the thread.

The direct action API 135 can initiate the conversion or activity to accomplish an action of the thread based on completion or time of completion of other actions of the thread. For example, the data processing system 105 can order a good or service (car share pick-up) directly or by communicating with the service provider computing device 160 within a threshold time period of a conclusion of a prior action in the thread. Within 5 minutes (or other time period) prior or subsequent to the scheduled or actual conclusion of the movie (second action), the data processing system 105 can confirm or order a car share service to send a car to pick up the end user at the movie theater (subsequent, third action). This can occur in the absence of input received from the end user computing device 150 during this time period, or responsive to a prompt received from the end user computing device 150 during this time period.

The direct action API 135 can initiate the conversions or other activity associated with the sequence dependent operations of the thread in any order. For example, the direct action API 135 (or other data processing system 105 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example the data processing system 105 initiates activity for an earlier (e.g., second) action subsequent to initiation of activity for the later (e.g., third) action.

The content selector component 125 can identify, select, or obtain multiple content items resulting from a multiple content selection processes. The content selection processes can be real-time, e.g., part of the same conversation, communication session, or series of communications sessions between the data processing system 105 and the client computing device 150 that involve a thread. The conversation can include asynchronous communications separated from one another by a period of hours or days, for example. The conversation or communication session can last for a time period from receipt of the first input audio signal until an estimated or known conclusion of a final action of the thread, receipt by the data processing system 105 of an indication of a termination of the thread. This can be referred to as the active time period of the thread. For example, for a thread with three actions (e.g., dinner, move, and transport home), the content selector component 125 can select at least one content item for each action. The content item selector component 125 can run or obtain results from a different content selection process for each action. In the content selection processes the content provider computing device 150 can set forth content items for selection by the content selector component 125. For a thread with at least three actions, the content item selector component can select or otherwise identify a first content item for the first action via a first content selection process, a second content item for the second action via a second content selection process, and a third content item for the third action via a third content selection process. The data processing system 105 that provides these content items for rendering by the client computing device 150 during the active time period of the thread can be considered to be operating in real-time. In this example the content selection processes and rendering of the content items occurs in real time.

The data processing system 105 can cancel actions associated with content items. For example, after ordering the car service the end user may watch the movie but then decide to walk home, or to have desert after the movie instead of taking a car home. An app or other program executing at the client computing device 150 as part of the data processing system 105 can receive an input audio signal of "cancel my ride home". The NLP component 110 can receive this input audio signal, for example as one or more packet based data messages, and can determine that this input audio signal relates to a pre-existing thread (e.g., dinner, movie, transport home) and is part of the same conversation or communication. For example, the NLP component 110 (or other data processing system 105 component) can evaluate time data, location data and pre-existing thread data such as past, present, or scheduled actions of a thread from the content data 148 of the data repository 145 to determine that an input audio signal relates to a pre-existing thread. Based, for example, on the request "ride" or the trigger keyword "cancel" the NLP component 110 can determine that the input audio signal "cancel my ride home" relates to the content item "would you like a ride home from the movie theater?" that corresponds to the third action of a pre-existing thread. The direct action API 135 (or other component) can cause the data processing system 105 to communicate via the interface 115 with the service provider computing device 160 to cancel the order for the taxi or car share service to have a car waiting for the end user outside the movie theater upon conclusion of the movie.

The NLP component 135 can receive the data packet or other protocol based message to cancel an action of the thread prior to or subsequent to completion of any action of the thread. The NLP component 135 can receive from the client computing device 150 (or obtain from the data repository 145) a data message (inbound audio signal) to cancel an action of the thread within a time interval triggered by an earlier action of the thread. For example, in a sequence dependent thread with three actions, dinner, movie, transport, the data processing system 105 can receive the transport cancellation data message within 5 minutes (or other time period) of the conclusion of the movie. The data processing system 105 can prompt for confirmation of a product or service related to an action of the thread. For example, during a time period between the first action and the second action (e.g., after dinner and before the movie) the data processing system 105 can transmit a data message to the client computing device 150 that, when rendered at the client computing device 150 outputs the audio or text message stating "just confirming that you still want a car waiting for you after the movie." The data processing system 105 can receive a response, e.g., "yes, confirmed" or "no, cancel the car". The direct action API 135 can execute scripts to process this information and can communicate with the service provider computing device 160 to indicate the confirmation or the cancellation.

Figure 2:
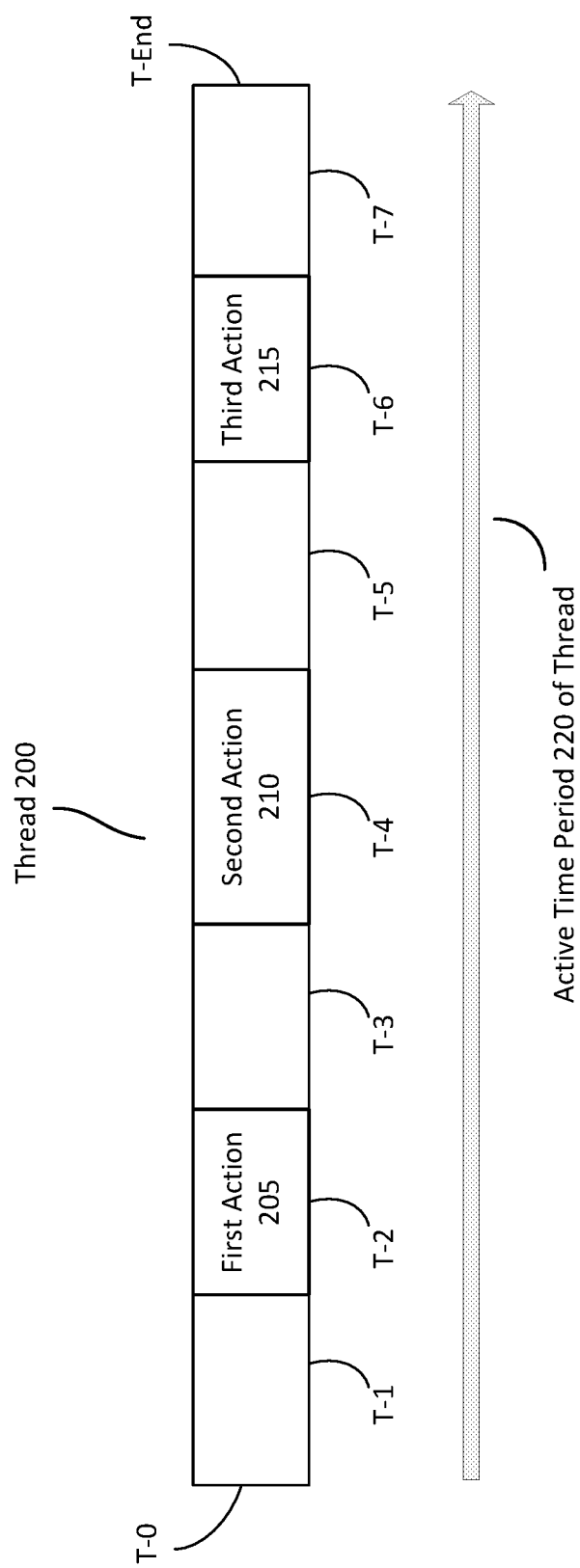
FIG. 2 depicts a functional diagram of a thread including sequence dependent actions.

FIG. 2 depicts a functional diagram of a thread 200 having sequence dependent actions including a first action 205, a second action 210, and a third action 215. The thread 200 can be determined by components of the data processing system 105 such as the prediction component 120. The data processing system 105 can receive the input audio signal, for example as data packets, via the interface 115 at time T-0 (T-zero). The data processing system 105 can determine that time T-0 is the beginning of the active time period 220 of the thread 200.

Based on requests or trigger keywords obtained from the input audio signal (e.g., "OK, I would like to go to go dinner and then a movie tonight"), the prediction component can identify a plurality of sequence dependent actions such as the first action 205 (e.g., dinner), the second action 210 (e.g., movie), and the third action 215 (e.g., ride home after the movie) that are predicted to occur in this order and where at least one action is dependent on the occurrence of at least one prior action. For example the third action 215 (a ride home from the movie theater) is dependent on occurrence of the second action (the end user arriving at the movie theater to watch the movie).

The data processing system 105 and components such as the content selector component 125 and the interface 115 can provide content items for rendering as audio output by the client computing device 150 during the active time period 220 of the thread 200. For example, the data processing system 105 can select and provide a content item (e.g., "would you like a ride home from the movie theater?") for the third action 215 during time period T-1, which is the time period from the beginning of the active time period 220 until the beginning of the first action 205 (e.g., a time of a dinner reservation). The data processing system 105 can select or provide any content items associated with any actions at any time during the active time period 220. For example, the first content item (for the third action 215) or a different content item for the third action 210 (e.g., a movie recommendation or an offer to purchase movie tickets) can be provided during the time period T-1 or any other time period of the active time period 220. The data processing system 105 can also determine that content items have timed out, and will not provide them for any further renderings during part of the active time period T1. For example, the data processing system 105 can determine not to provide a content item for the first action 205 (e.g., dinner at time T-2) after the second action 210 (e.g., movie at time T-4) is determined by the data processing system 105 to have started. In this example, the content item for the first action 205 can be provided to the client computing device at between time T-1 (before the first action 205) and T-3 between the first action 205 and the second action 210).

At least one content item for the third action 215 (e.g., ride home) can still be provided during times T-1 through T-6, and even during time T-7, e.g., a period after the data processing system 105 determines that the movie is over but the end user elects to indicate to the data processing system 105 that the end user remains out for the evening. During the time period T-5, between the second action 210 and the third action 215, or any other time period of the active time period 220 such as T-6 (during the third action 215) or T-7 (after the third action 215), the data processing system 105 can provide content items related to the third action 215 to remarket, or prompt for confirmation of an action such as confirmation of a reserved car of a car share service.

Figure 3:
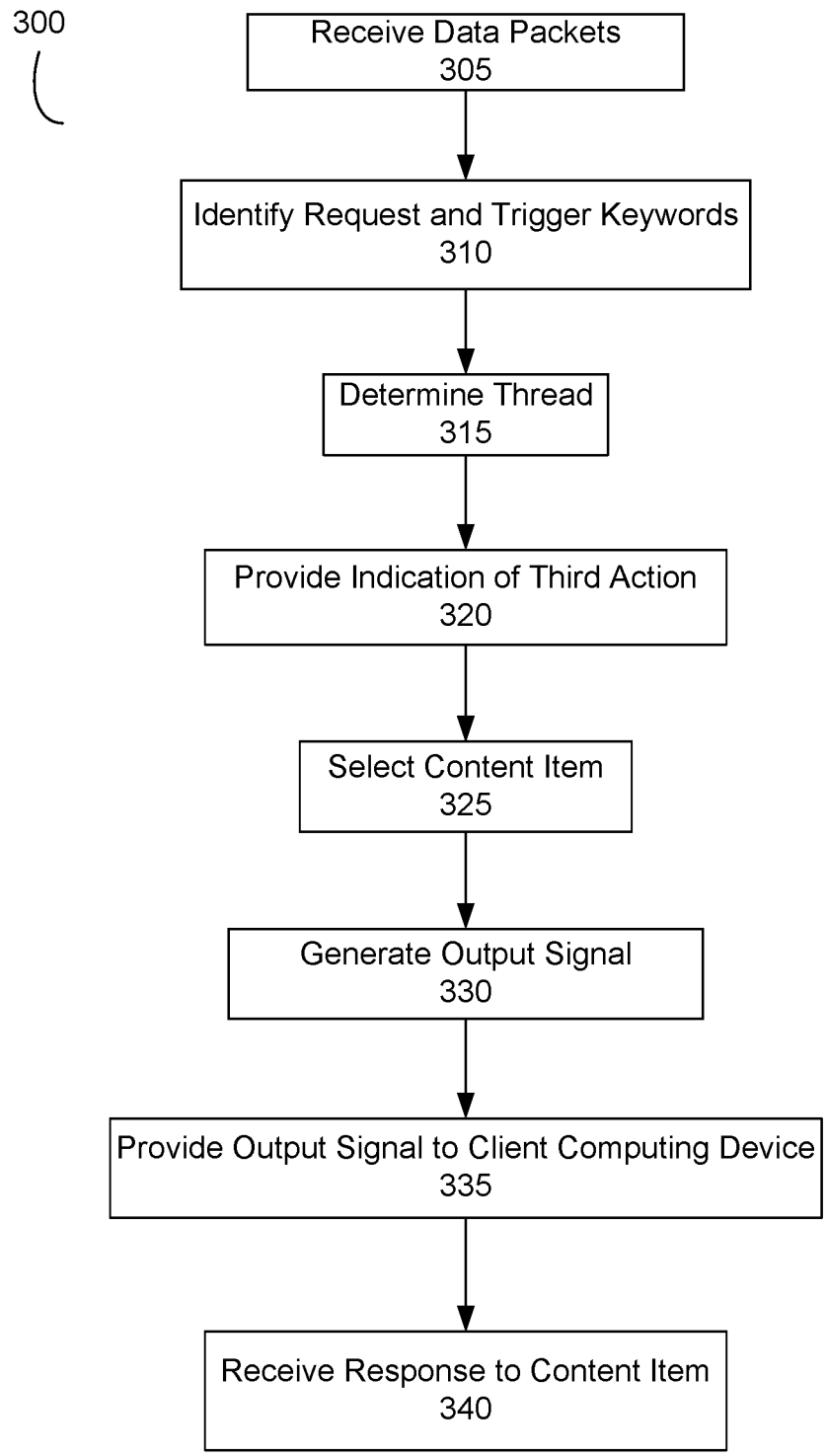
FIG. 3 depicts method to invoke actions for sequence dependent operations in a voice activated data packet based computer network environment.

FIG. 3 depicts a method 300 to invoke actions for sequence dependent operations in a voice activated data packet based computer network environment such as the system 100. The method can receive data packets (ACT 305). For example, the data processing system 105 can execute, launch, or invoke the NLP component 110 to receive packet or other protocol based transmissions via the network from the client computing device 150. The data packets can include or correspond to an input audio signal detected by the sensor 151, such as an end user saying "OK, I would like to go to go dinner and then a movie tonight" into a smartphone.

The method 300 can identify at least one request or at least one trigger keyword from the input audio signal (ACT 310). For example, the NLP component 110 can parse the input audio signal to identify requests ("dinner" or "movie") as well as trigger keywords "go" "go to" or "to go to" that correspond or relate to the request. The method 300 can determine at least one thread (ACT 315) based on the requests or the trigger keywords. The thread can include a series of sequence dependent actions that the data processing system 100 determines will occur in a set order, such as a thread 200 where the second action 210 occurs at time T-4, subsequent to the first action that occurs at time T-2, and where the third action 215 occurs at time T-6, subsequent to the second action 210 and subsequent to the first action 205.

The method 300 can provide an indication of the third action to the content selector component 125 (ACT 320). For example, the content selector component 125 can receive the indication of the third action 215 prior to occurrence of the first action 205 (prior to time T-2) or prior to occurrence of the second action 210 (prior to time T-4). Responsive to the indication of the third action, or based on the requests and the trigger keywords, the content selector component can select at least one content item corresponding to the third action (ACT 325). The method 300 can generate at least one output signal (ACT 330) corresponding to the content item, and can provide the output signal (ACT 335) to the client computing device 150. For example, the interface 115 can transmit data packets that include the output signal from the data processing system 105 to the client computing device 150. The data processing system 105 can delay or prevent transmittal of the data packets until the data processing system 105 detects the occurrence of a condition, such as the expiration of one of time periods T1-T7, or until receipt of an authorization from the client computing device 150.

The output signal can cause the client computing device 150 (e.g., can cause an app or other component of the data processing system 105 that resides and executes at the client computing device 150 to drive the speaker 154 to generate an acoustic wave that corresponds to the output signal (and to the content item). This audio output of the content item from the client computing device 150 can occur prior to occurrence of the first action 205 (e.g., before time T2) or prior to occurrence of the second action 210 (e.g., before time T-4). The method 300 can receive from the client computing device 150 a response to the content item (ACT 340). For example, the data processing system 105 can receive a response signal (ACT 340) generated from audio input into the client computing device that requests that an action be initiated or taken, such as a request to reserve a taxi or purchase event tickets. The direct action API 135 can invoke programs to take or initiate the requested action. This action can be initiated by the direct action API based on receipt of the response signal (ACT 340) as well as other factors such as the time of completion of an action, e.g., the end of the second action 210 at the boundary between time T-4 and time T-5. The action can also be cancelled. For example, subsequent to receiving the response signal (ACT 340), the data processing system 105 can cancel the action due to a cancellation or termination of actions of the thread, changes to the thread, or receipt by the data processing system 105 of a cancellation request from the client computing device 150.

Figure 4:
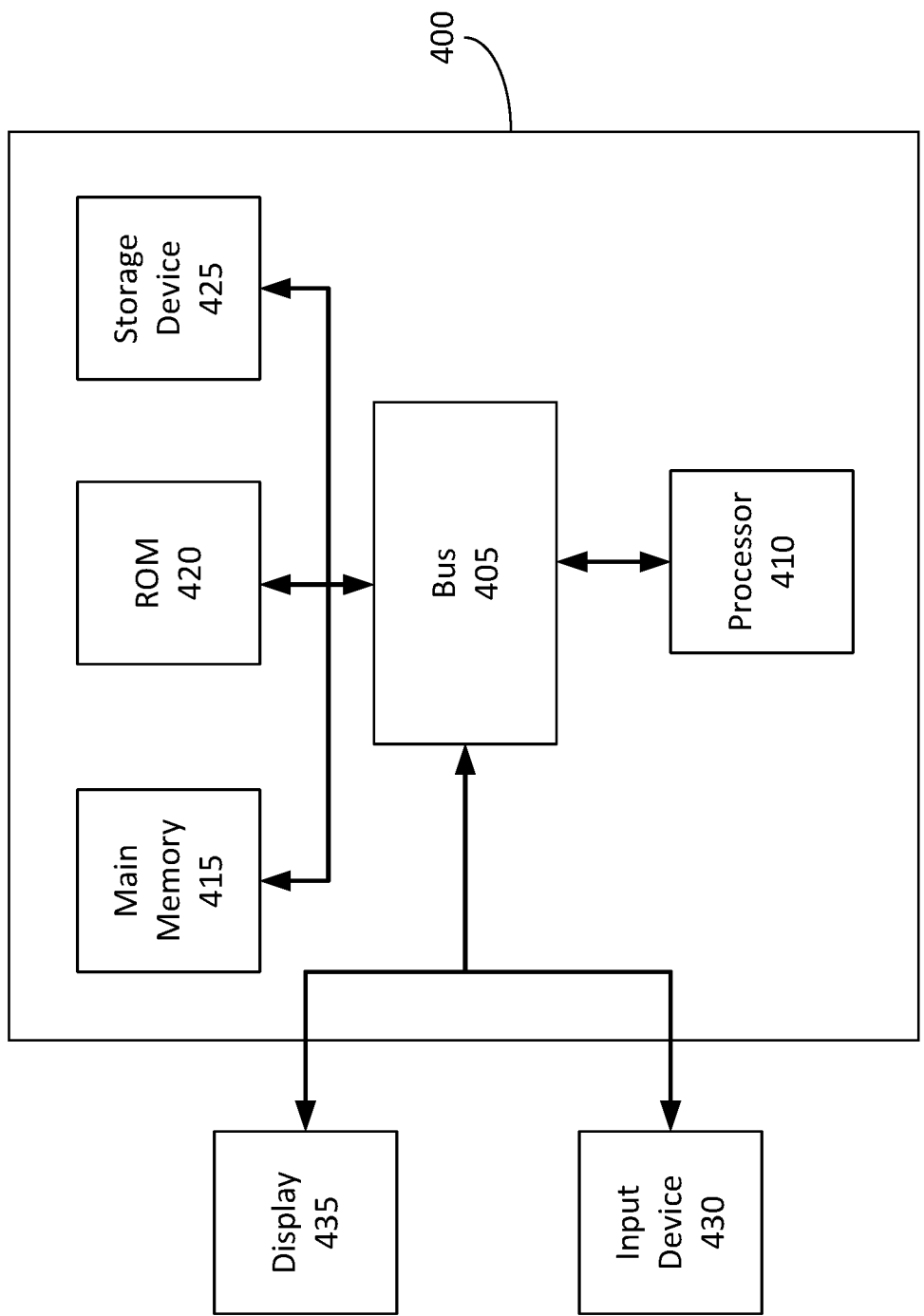
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100, or its components such as the data processing system 105. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 105, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, prediction component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the prediction component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims.

Accordingly, neither the reference signs nor their absence have any limiting effect on the scope of any claim elements.

The systems and methods described herein may be embodied in other specific forms without departing from the characteristics thereof. For example, the data processing system 105 can select a content item for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to process sequence dependent operations in a voice activated data packet based computer network environment, comprising:
    a natural language processor component executed by a data processing system to receive input data packets comprising an input audio signal detected by a sensor of a client computing device;
    the natural language processor component to parse the input audio signal to identify a keyword;
    a prediction component to determine a thread based on the keyword, the thread comprising a first action, a second action subsequent to the first action, and a third action subsequent to the second action;
    the prediction component to provide, to a content selector component of the data processing system, an indication of the third action prior to occurrence of at least one of the first action and the second action;
    the content selector component to bypass content selection based on the first action and the second action in order to identify, via a real-time content selection process, a content item based on the third action predicted to occur by the prediction component, the content item provided by a third-party content provider;
    an interface of the data processing system to transmit data packets comprising the content item to cause the client computing device to present the content item;
    the content selector component to identify, via a subsequent real-time content selection process executed subsequent to occurrence of the first action, a second content item provided by the third-party content provider or a second third-party content provider; and
    the interface to transmit the second content item to cause the client computing device to present the second content item prior to occurrence of the third action.

2. The system of claim 1, comprising:
    the natural language processor component to parse the input audio signal to identify a request and a trigger keyword corresponding to the request.

3. The system of claim 1, comprising the data processing system to:
    generate an output signal comprising the content item; and
    transmit the output signal to cause an audio driver component executed by the client computing device to drive a speaker of the client computing device to generate an acoustic wave corresponding to the output signal prior to occurrence of at least one of the first action and the second action.

4. The system of claim 1, comprising the data processing system to:
    generate an output signal comprising the content item; and
    transmit the data packets comprising the output signal to cause an audio driver component executed by the client computing device to drive a speaker of the client computing device to generate an acoustic wave corresponding to the output signal subsequent to occurrence of the first action and prior to occurrence of the second action.

5. The system of claim 1, comprising the data processing system to:
    the data processing system to receive, from the client computing device a data message that includes a response to the content item prior to occurrence of at least one of the first action or the second action.

6. The system of claim 1, comprising:
    the data processing system to initiate the third action based on one of a time of completion of the first action and a time of completion of the second action.

7. The system of claim 1, comprising:
    a direct action application programming interface of the data processing system to initiate the third action subsequent to completion of at least one of the first action and the second action.

8. A system to expand sequence dependent operations in a voice activated data packet based computer network environment, comprising:
    a natural language processor component executed by a data processing system to receive input data packets comprising an input audio signal detected by a sensor of a client computing device;
    the natural language processor component to parse the input audio signal to identify a request and a trigger keyword corresponding to the request;
    the data processing system to determine a thread based on the trigger keyword and the request, the thread comprising a first action, a second action subsequent to the first action, and a third action subsequent to the second action;
    an audio signal generator component executed by the data processing system to generate an output signal corresponding to the thread;
    an interface of the data processing system to transmit data packets comprising the output signal generated by the audio signal generator component and cause an audio driver component executed by the client computing device to drive a speaker of the client computing device to generate an acoustic wave corresponding to the output signal prior to occurrence of at least one of the first action, the second action or the third action;
    a content selector component of the data processing system to bypass content selection based on the first action and the second action in order to identify, via a real-time content selection process executed prior to occurrence of the third action, a content item based on the third action, the content item provided by a third-party content provider; and
    transmit the content item to cause the client computing device to present the content item prior to occurrence of the third action.

9. The system of claim 8, comprising the data processing system to:
  transmit the data packets comprising the output signal to cause to cause the audio driver component executed by the client computing device to drive the speaker of the client computing device to generate the acoustic wave corresponding to the output signal subsequent to occurrence of the first action and prior to occurrence of the second action.

10. The system of claim 8, comprising the data processing system to:
  the data processing system to receive, from the client computing device a data message that includes a response to the content item prior to occurrence of at least one of the first action or the second action.

11. The system of claim 8, comprising:
  the data processing system to initiate the third action based on one of a time of completion of the first action and a time of completion of the second action.

12. The system of claim 8, comprising:
  a direct action application programming interface of the data processing system to initiate the third action subsequent to completion of at least one of the first action and the second action.

13. The system of claim 8, comprising:
  a direct action application programming interface of the data processing system to initiate activity corresponding to the third action and to subsequently initiate activity corresponding to the second action.

14. The system of claim 8, comprising the data processing system to:
  select, for the first action, a second content item via a second real-time content selection process and to select, for the second action, a third content item via a third real-time selection process.

15. A method of processing sequence dependent operations in a voice activated data packet based computer network environment, comprising:
  receiving, by a data processing system comprising one or more processors and memory, data packets comprising an input audio signal detected by a sensor of a client computing device;
  parsing, by the data processing system, the input audio signal to identify a keyword;
  determining, by the data processing system, a thread based on the keyword, the thread comprising a first action, a second action subsequent to the first action, and a third action subsequent to the second action;
  providing, by the data processing system, an indication of the third action prior to occurrence of at least one of the first action and the second action;
  bypassing, by the data processing system, content selection based on the first action and the second action in order to identify a content item based on the third action predicted to occur by the data processing system, the content item provide by a third-party content provider;
  transmitting, by the data processing system, data packets comprising the content item to cause the client computing device to present the content item;
  identifying, by the data processing system via a real-time content selection process executed subsequent to the occurrence of the first action, a second content item provided by the third-party content provider or a second third-party content provider; and
  transmitting, by the data processing system, the second content item to cause the client computing device to present the second content item prior to occurrence of the third action.

16. The method of claim 15, comprising:
  identifying the content item via a second real-time content selection process.

\* \* \* \* \*